US007089921B2

(12) United States Patent
Matsuoka et al.

(10) Patent No.: US 7,089,921 B2
(45) Date of Patent: Aug. 15, 2006

(54) INTAKE MANIFOLD FOR INTERNAL COMBUSTION ENGINE

(75) Inventors: Kazuya Matsuoka, Atsugi (JP); Kazuhiro Fujiwara, Atsugi (JP); Yoshikazu Tsuruoka, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/138,440

(22) Filed: May 27, 2005

(65) Prior Publication Data

US 2005/0263143 A1 Dec. 1, 2005

(30) Foreign Application Priority Data

May 27, 2004 (JP) ............................ 2004-157345

(51) Int. Cl.
*F02M 25/06* (2006.01)

(52) U.S. Cl. ............ 123/572; 123/184.24; 123/184.26

(58) Field of Classification Search ................ 123/572, 123/184.22, 184.24, 184.25, 184.26
See application file for complete search history.

(56) References Cited

U.S. PATENT DOCUMENTS 4,545,331 A * 10/1985 Ito et al. ................ 123/184.32
4,715,329 A * 12/1987 Yasuda et al. .............. 123/572
6,192,848 B1 * 2/2001 Hada et al. ............ 123/184.24
6,334,437 B1 * 1/2002 Jessberger ............. 123/568.12
6,805,087 B1 * 10/2004 Yakabe et al. ......... 123/184.25
6,807,957 B1 * 10/2004 Ko ............................ 123/572
7,017,562 B1 * 3/2006 Jeon ........................... 123/572

FOREIGN PATENT DOCUMENTS

JP 11-82197 A 3/1999

* cited by examiner

*Primary Examiner*—Erick R Solis
(74) *Attorney, Agent, or Firm*—Foley & Lardner LLP

(57) ABSTRACT

An intake manifold (1) of a multi-cylinder internal combustion engine comprises a single pipe portion (4), a collector (5) connected to the pipe portion (4), and a plurality of branch pipes (6) branching from the collector (5) to each cylinder. The pipe portion (4) and the collector (5) divided into a plurality of spaces (1$a$, 1$b$) by a partitioning member (12). Blow-by gas is equally distributed to each cylinder using a simple structure comprising a discharge vent (3) for blow-by gas in the pipe portion (4) extending over the partitioning member (12) and being equal to the two spaces (1$a$, 1$b$). It is preferred that a notch (8) is formed facing the discharge vent (3) on the partitioning member (12).

8 Claims, 8 Drawing Sheets

INTAKE MANIFOLD FOR INTERNAL COMBUSTION ENGINE

FIELD OF THE INVENTION

This invention relates to a process for blow-by gas in an internal combustion engine.

BACKGROUND OF THE INVENTION

A quite limited portion of a gaseous mixture aspirated into the cylinders of an internal combustion engine flows downwardly from a space between a piston and a cylinder block and accumulates in the crank case. This outflowing gaseous mixture is termed blow-by gas.

In order to combust the blow-by gas in a multi-cylinder engine, for example, the oil pan and the intake manifold of the engine are connected by a blow-by gas recirculation passage whereby blow-by gas is mixed into the gaseous mixture supplied to the cylinders using the negative intake pressure of the intake manifold. During this process, unequal distribution of blow-by gas to the respective cylinders results in deviations in the air-fuel ratio of each cylinder and has adverse effects on combustion and exhaust gas composition.

SUMMARY OF THE INVENTION

In this context, Tokkai-Hei-11-82197 published by the Japan Patent Office in 1999 proposes a method of distributing blow-by gas from the blow-by gas recirculation passage to respective branch pipes provided in the intake manifold.

However this prior-art technique requires a distribution passage connecting each branch pipe in the intake manifold with the blow-by gas recirculation passage. Furthermore since the length of the distribution passages is not equal, the distribution amount of blow-by gas to each cylinder is not always equal.

It is therefore an object of this invention to realize more uniform distribution of blow-by gas using a simple structure.

In order to achieve the above object, this invention provides an intake manifold for supplying air to each cylinder of a multi-cylinder internal combustion engine. The engine has a blow-by gas passage that recirculates blow-by gas generated by the engine into the intake manifold.

The intake manifold comprises a pipe portion, a collector connected to the pipe portion, a plurality of branch pipes branching from the collector, a partitioning member partitioning the internal section of the pipe portion and the collector into a plurality of spaces, and a blow-by gas discharge vent having an opening straddling the partitioning member and allowing discharge of the blow-by gas from the blow-by gas passage into the spaces on both sides of the partitioning member.

The details as well as other features and advantages of this invention are set forth in the remainder of the specification and are shown in the accompanying drawings.

DESCRIPTION OF THE PREFERRED EMBODIMENTS

Figure 1:
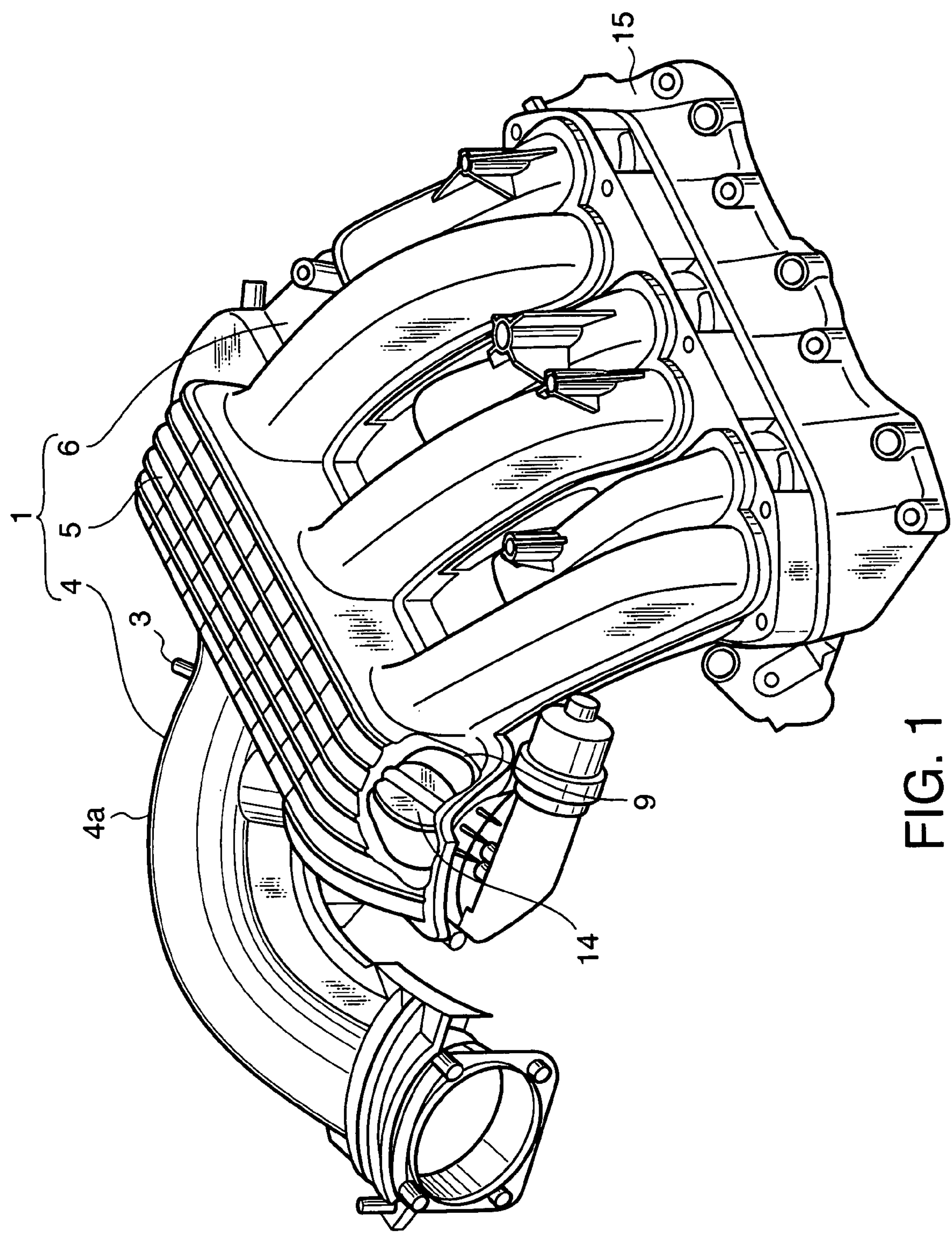
FIG. 1 is a perspective view of an intake manifold for an internal combustion engine according to this invention.

Referring to FIG. 1 of the drawings, an intake manifold 1 of a V-type six-cylinder internal combustion engine for a vehicle comprises a pipe portion 4, a collector 5 and six branch pipes 6.

The intake manifold 1 is adapted for use with two banks in the V-type six cylinder internal combustion engine. The central line of the series of cylinders in each bank of the internal combustion engine is disposed in the engine room such that it is parallel to the longitudinal orientation of the vehicle in a so-called length side type engine. Each cylinder of the internal combustion engine repeats the combustion cycle in sequence by fixed crank angle deviations.

The pipe portion 4 is connected to the intake passage of the internal combustion engine and supplies intake air after a flow rate regulation by a throttle to the collector 5. The collector 5 supplies air from the pipe portion 4 to each branch pipe 6 after temporary storage.

Figure 3:
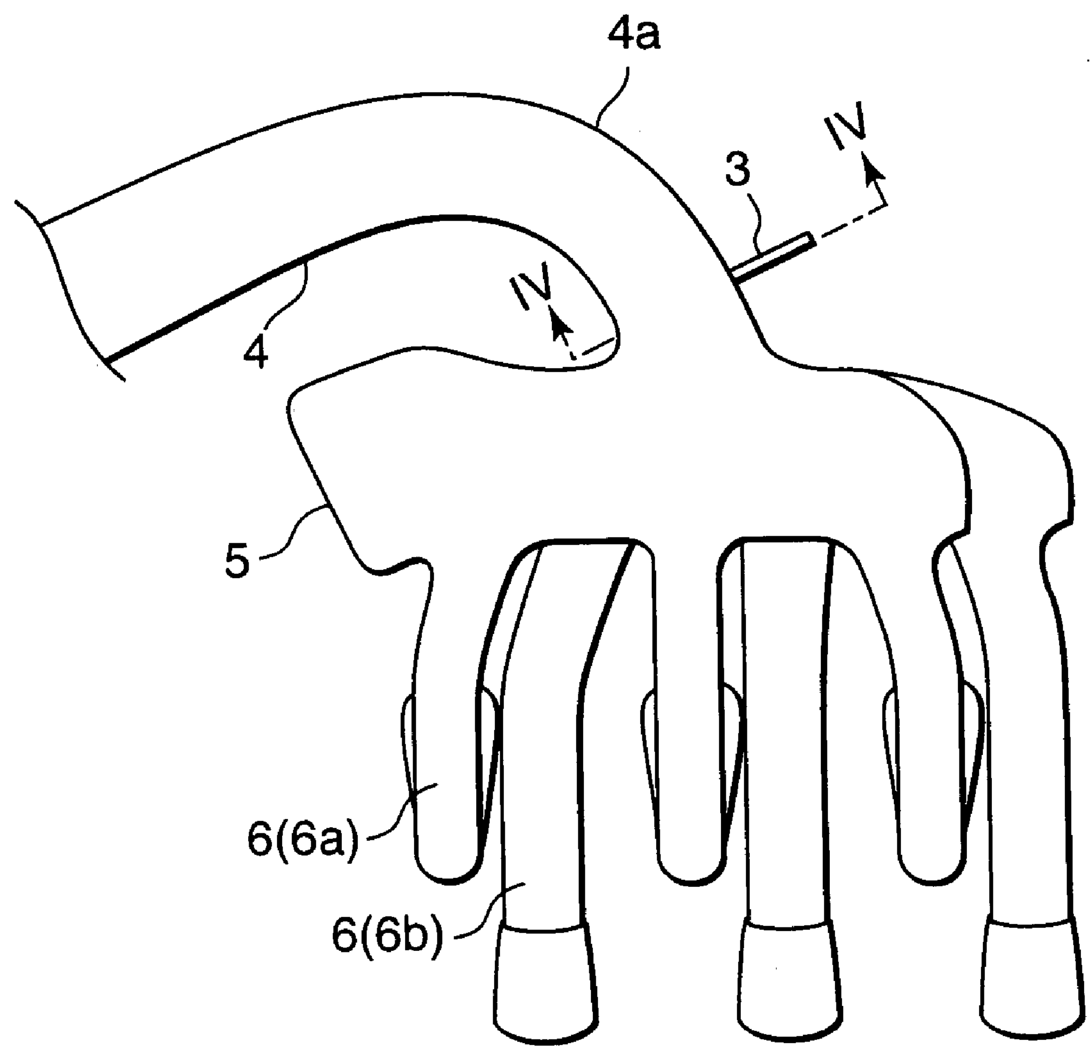
FIG. 3 is a plan view seen from above of the intake manifold.

The branch pipe 6 is connected to a cylinder head 15 of each bank of the internal combustion engine. When the intake manifold 1 is viewed from above, as shown in FIG. 3, three branch pipes 6*a* of the six branch pipes 6 are connected to one of the banks with the remaining three branch pipes 6*b* connected to the other bank.

Three cylinders and the intake port connected to the cylinder corresponding to each branch pipe 6 are formed on the inner side of each cylinder head 15. A piston is provided in each cylinder. Air is aspirated into each cylinder from a branch pipe 6 through an intake port in response to the reciprocating motion of the piston in order to create a gaseous mixture in the cylinder as a result of mixing fuel injected into the intake air.

Referring again to FIG. 1 of the drawings, a curved section 4*a* is formed in the pipe portion 4 in order to supply air to the collector 5 after varying the direction of air flow aspirated from the forward section of the vehicle. A discharge vent 7 is formed in the blow-by gas passage 3 in a position corresponding to the outer periphery of the curved section 4*a* in proximity to the section making a connection with the collector 5.

Figure 2A:
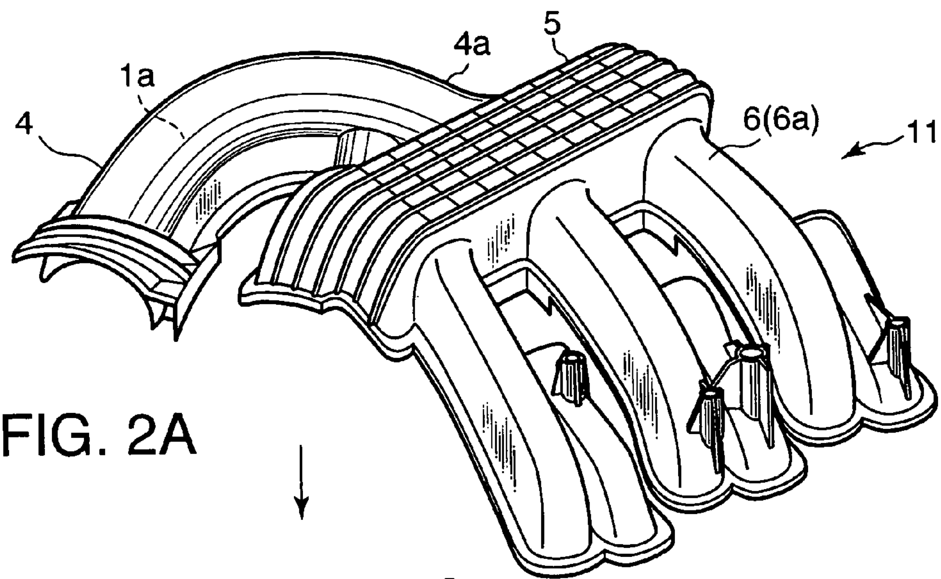
FIGS. 2A–2C are exploded perspective views of the intake manifold.
Figure 2B:
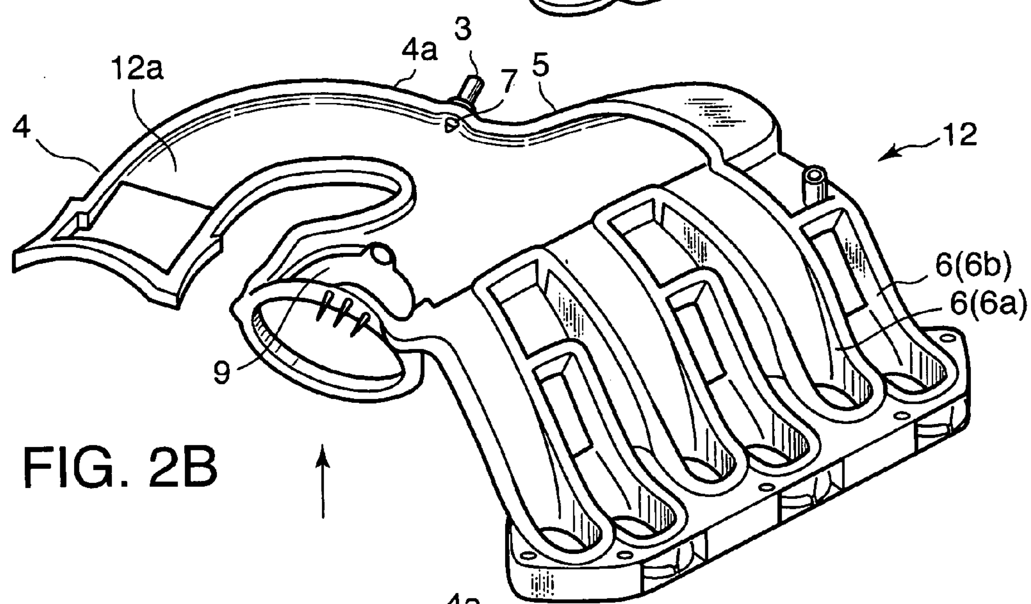
Figure 2C:
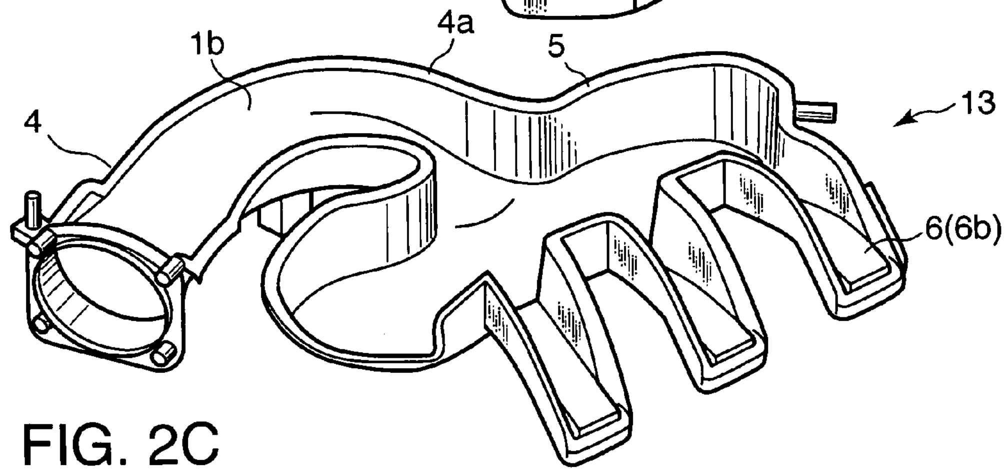

Referring now to FIGS. 2A–2C, the intake manifold 1 comprises an upper housing 11 and a lower housing 13 dividing the manifold vertically, and a partitioning member 12 gripped by the upper housing 11 and the lower housing 13. The upper housing 11, the lower housing 13 and the partitioning member 12 are respectively formed by molded resin.

The partitioning member 12 is provided with a horizontal plate 12*a* vertically bisecting the inner section of the collector 5 and the pipe portion 4. The inner section of the pipe portion 4 and the collector 5 therefore are divided into an upper space 1*a* and a lower space 1*b*. The upper space 1*a* is connected to branch pipes 6*a* and the lower space 6*b* is connected to branch pipes 6*b*.

The discharge vent 7 of the blow-by gas passage 6 is formed on the side face of the pipe portion 4 to face the horizontal plate 12*a* from the side. As shown in FIGS. 4A, 4B and FIGS. 5A, 5B, the notch 8 connecting the upper space 1*a* and the lower space 1*b* is formed in the periphery of the discharge vent 7 in the horizontal plate 12*a*. FIG. 4B is an enlarged view of region C in FIG. 4A. FIG. 5B is an enlarged view of region D in FIG. 5A.

A notch 9 connecting the upper space 1*a* and the lower space 1*b* is also formed in the horizontal plate 12*a* in the collector 5. A variable intake valve 14 is provided in the notch 9 as shown in FIG. 1. The variable intake valve 14 is a butterfly valve opening and closing in response to the rotation speed of the internal combustion engine and applies a resonant supercharging effect to the intake air into the cylinder.

The blow-by gas passage 3 recirculates blow-by gas accumulating in the crank case to the intake manifold 1. The preferred characteristics of the discharge vent 7 of the blow-by gas passage 3 are discussed hereafter.

Figure 4A:
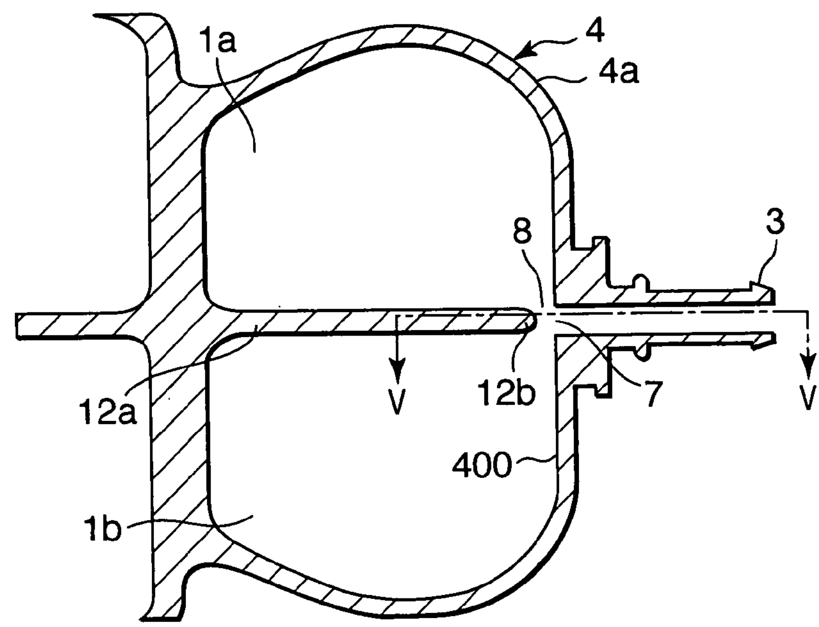
FIGS. 4A and 4B are a vertical sectional view of an intake pipe and a blow-by gas passage according to this invention taken along the line IV—IV in FIG. 3, and an enlarged view of an essential parts in the vertical sectional view.
Figure 4B:
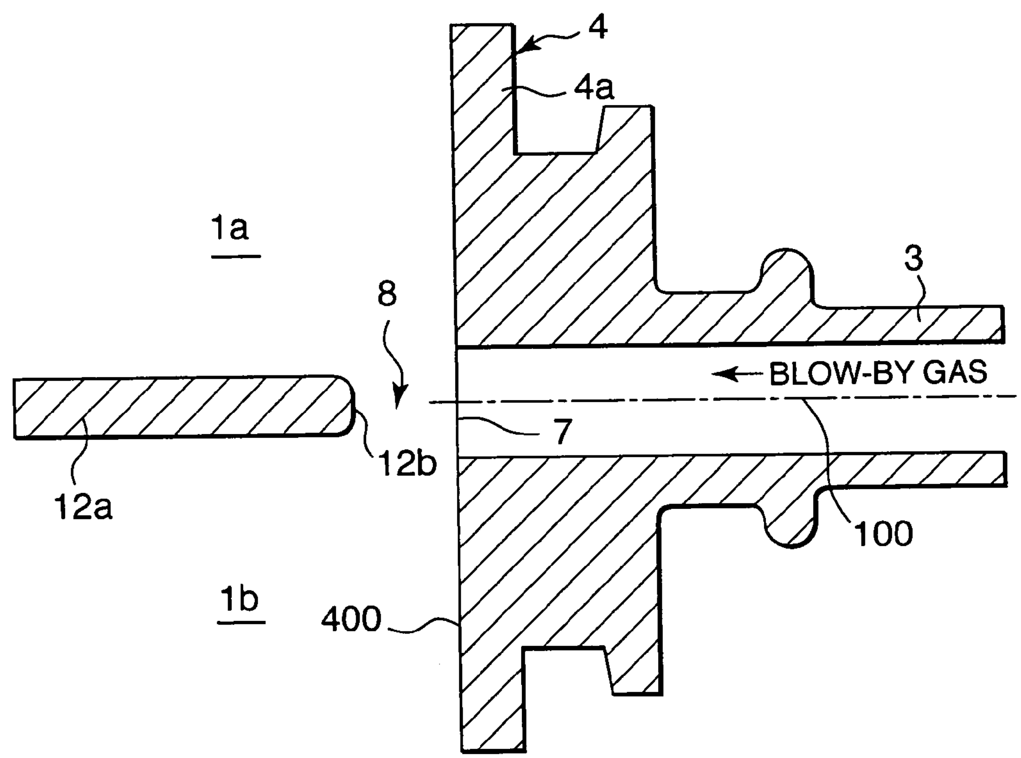

As shown in FIGS. 4A, 4B, the discharge vent 7 is positioned on the outer periphery of the curved section 4*a* to face the notch 8 of the horizontal plate 12*a* side-on. The open surface area of the discharge vent 7 facing the upper space 1*a* is approximately equal to the open surface area of the discharge vent 7 facing the lower space 1*b*.

It should be noted that the number of the discharge vent 7, i.e., one, is less than the number of the spaces partitioned by the partitioning member 12, i.e., two. The discharge vent 7 is provided in proximity to the connection between the pipe portion 4 and the collector 5.

Figure 5A:
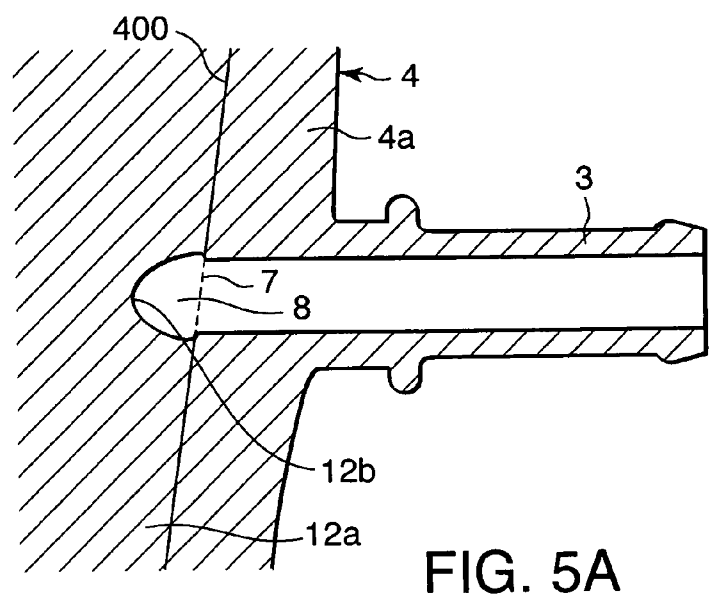
FIGS. 5A and 5B are a horizontal sectional view of a discharge vent for a blow-by gas passage according to this invention taken along the line V—V in FIG. 4A, and an enlarged view of essential parts in the horizontal sectional view.
Figure 5B:
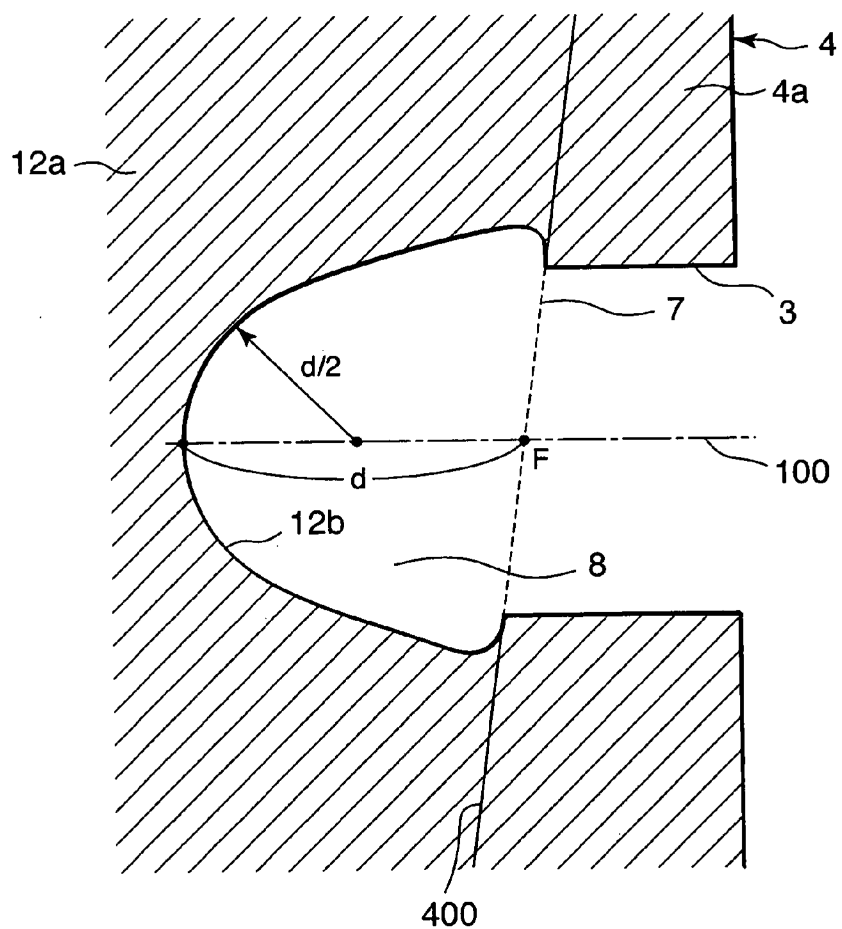

Referring now to FIGS. 5A and 5B, the notch 8 is formed in the section facing the discharge vent 7 of the horizontal plate 12*a*. As shown in FIG. 5B, if the intersection of the notch 8 with the central line 100 of the discharge vent 7 is designated as E and the intersection of the inner wall face 400 of the pipe portion 4 and the central line 100 is designated as F, the shape of the notch 8 near to the point E forms an arc having a radius equal to the distance d between the points EF.

The sectional face of an edge 12*b* of the horizontal plate 12*a* is formed to have a curved vertical sectional form as shown in FIG. 4B along the entire periphery of the notch 8.

An amount of air regulated by the throttle is aspirated into the pipe portion 4 of the intake manifold 1 and then distributed between the upper space 1*a* and the lower space 1*b* by the horizontal plate 12*a*.

The intake air is however not distributed evenly to the upper and lower spaces 1*a*, 1*b*, but the majority of the intake air is provided to one of the spaces connected to a cylinder in the intake stroke. The intake strokes of the six cylinders are consequently performed with a fixed angular interval, and a regular pressure variation in the collector 5 appears as a result. This pressure variation is named an intake air pulsation.

This invention separates the pipe portion 4 and the collector 5 into two spaces 1*a*, 1*b* by the partitioning member 12 such that the velocity of intake air in the upper space 1*a* or lower space 1*b* which provides intake air to the cylinder in the intake stroke is about twice the intake air velocity in the intake manifold where the partitioning member 12 is not implemented. This increase in the intake air velocity promotes a better mixing of the blow-by gas and intake air and evens out the distribution of the blow-by gas to the respective cylinders, On the other hand, the blow-by gas flowing into the pipe portion 4 from the discharge vent 7 of the blow-by gas passage 3 is distributed into the upper space 1*a* and the lower space 1*b* by the notch 8 of the horizontal plate 12*a*. The blow-by gas distributed into the upper space 1*a* is mixed with the intake air aspirated into the upper space 1*a*, and the mixture is distributed to the branch pipes 6*a*. Similarly, the blow-by gas distributed into the lower space 1*b* is mixed with the intake air aspirated into the lower space 1*b*, and the mixture is distributed to the branch pipes 6*b*. The amount of the blow-by gas distributed to the upper space 1*a* and that distributed to the lower space 1*b* are however not the same. Blow-by gas is distributed more to the space 1*a* or 1*b* that has a lower pressure.

Figure 7B:
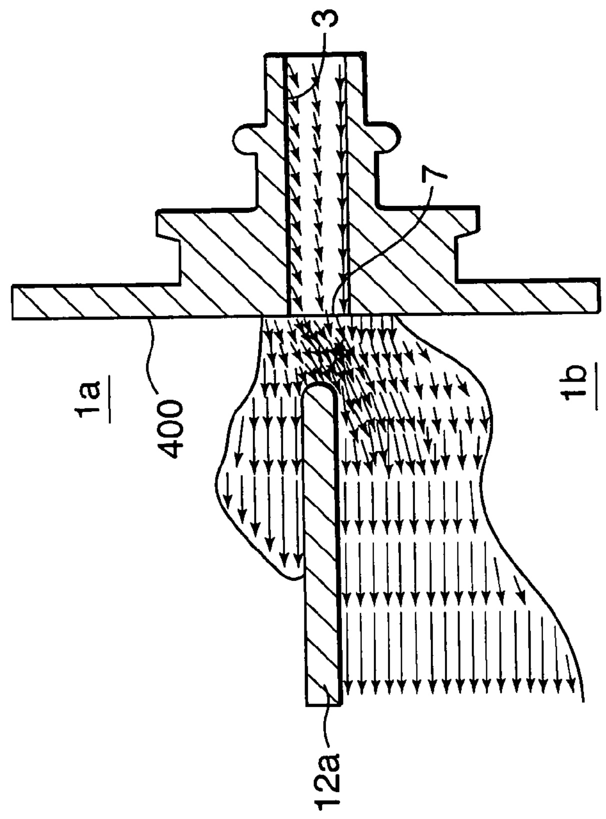
FIGS. 7A and 7B are longitudinal sectional views of the discharge vent showing the flow of blow-by gas blowing into an intake pipe.
Figure 7A:
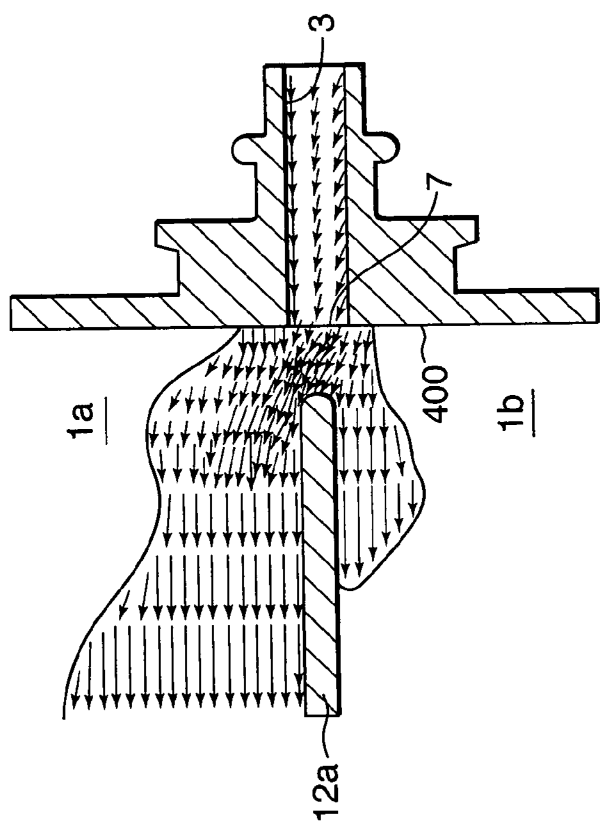

Referring now to FIGS. 7A and 7B, a pressure difference exists between the upper space 1*a* and the lower space 1*b* of the intake manifold 1 due to pulsation in the intake air flowing into the internal combustion engine. As a result, when the pressure in the lower space 1*b* is reduced by the upper space 1*a*, as shown by FIG. 7A, blow-by gas flowing out of the discharge vent 7 into the pipe portion 4 largely flows into the upper space 1*a*.

Figure 8:
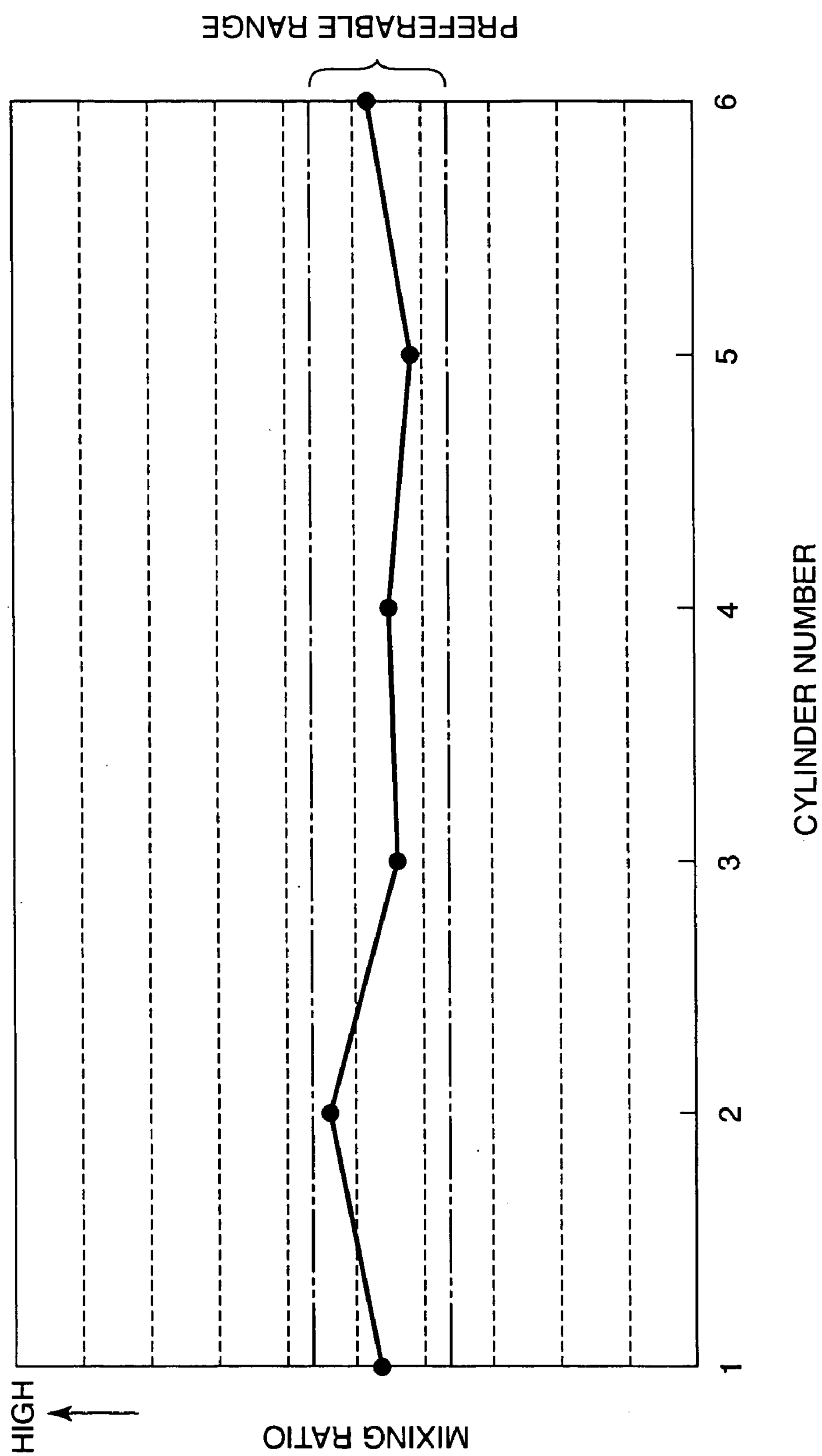
FIG. 8 is a diagram showing a mixing ratio of an air-fuel mixture in the respective cylinders in a six-cylinder internal combustion engine when this invention is applied.

However, the distribution of blow-by gas to the upper space 1*a* and the lower space 1*b* becomes uniform due to the fact that the variation in the intake amount of the blow-by gas shown in FIGS. 7A and 7B is repeated on numerous occasions in a short time interval in response to the intake air pulsation of the internal combustion engine. As shown in FIG. 8, it is possible to homogenize the distribution amount of blow-by gas to each cylinder and to restrict deviations in the distribution amount to preferred levels.

The notch 8 operates to reduce flow resistance to blow-by gas flowing into the pipe portion 4 from the discharge vent 7. The cross section of the edge 12*b* of the horizontal plate 12*a* having a curved vertical sectional form divides the blow-by gas into two portions as the gas flows into the notch 8 from the discharge vent 7. Consequently the blow-by gas is introduced smoothly into the upper space 1*a* and the lower space 1*b*.

Figure 6:
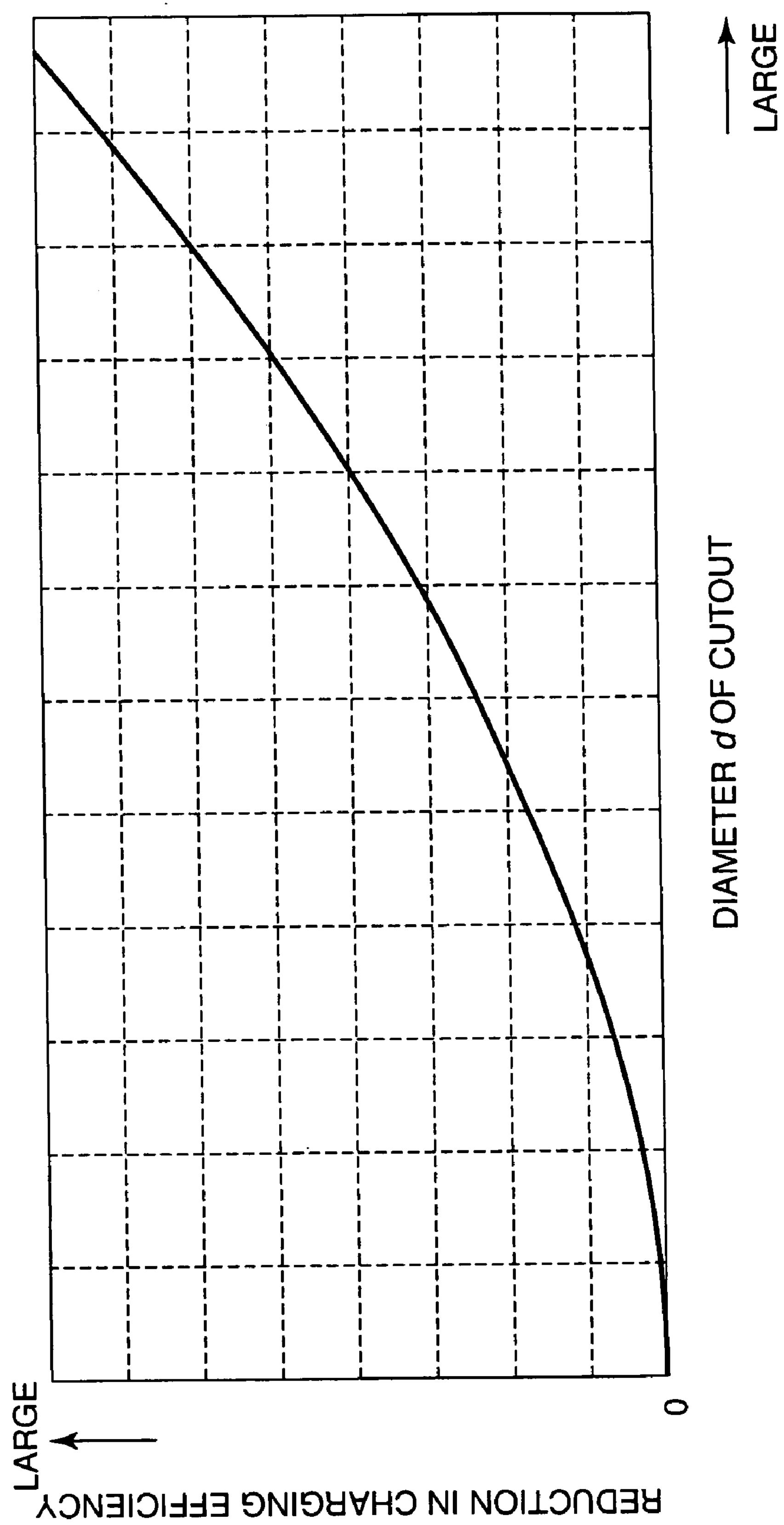
FIG. 6 is a diagram showing the relationship between a radius of a notch and loss of intake charging efficiency according to this invention.

Referring now to FIG. 6, the effect of the inner radius d of the notch 8 on the charging efficiency of intake air to the cylinders will be described hereafter.

In this embodiment, a resonant supercharging effect is obtained as a result of the variable intake valve 14 provided on the notch 9 on the horizontal plate 12*a* opening and closing in response to the rotation speed of the internal combustion engine. When a pressure wave is transmitted from one to the other of the upper space 1*a* and the lower space 1*b* through the notch 8 for the discharge vent 7 of the blow-by gas passage 3, resonant supercharging effects and the charging efficiency of the cylinders are adversely affected.

More precisely, as shown in FIG. 6, the reduction in the charging efficiency of the cylinders increases as the diameter d of the notch 8 increases. In FIG. 6, when the diameter d of the notch 8 is zero, the loss in the intake charging efficiency is zero. On the other hand, when a notch 8 is not provided, outflow resistance to blow-by gas from the discharge vent 7 becomes excessive and problems arise regarding the introduction of blow-by gas.

The dimensions of the notch 8 are preferably defined with respect to maintaining resonant supercharging characteristics and suppressing outflow resistance to blow-by gas.

As discussed above, it is possible to make the distribution of blow-by gas to each cylinder uniform at a low cost as a result of the provision of a discharge vent 7 for blow-by gas opened in the upper space 1*a* and the lower space 1*b* straddling the horizontal plate 12*a*.

Furthermore it is possible to create a good balance between resonant supercharging effects and discharge resistance to blow-by gas by forming a notch 8 in the horizontal plate 12*a* facing the discharge vent 7.

The discharge vent 7 is provided on the outer periphery of the curved section 4*a* of the pipe portion 4. Therefore blow-by gas becomes mixed with the flow of intake air which displaces at a high flow speed via the inner periphery of the curved space 4*a*.

By mixing with such a high speed air flow, mixture of blow-by gas with the intake air is promoted and further ensures uniform distribution of blow-by gas to each cylinder.

Since the discharge vent 7 for blow-by gas is provided in proximity to the connection of the collector 5 and the pipe portion 4, the discharge vent 7 is positioned sufficiently downstream of the intake throttle. Thus it is possible to avoid deposition on the throttle.

The contents of Tokugan 2004-157345, with a filing date of May 27, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the embodiment above, the intake manifold 1 comprises a combination of three resin members 11–13 as shown in FIGS. 2A–2C. However, the number of combined resin members may be arbitrarily selected.

The members comprising the intake manifold 1 are not limited to resin members. It is possible to form a pre-formed integrated unit instead of combining members in order to form the intake manifold 1.

The variable intake valve 14 creating resonant supercharging effects and the notch 9 formed on the horizontal plate 12*a* corresponding to the disposition of the variable intake valve 14 realize the preferred operation of the embodiments of the invention. However those components are not indispensable to realize this invention itself and may be omitted. The curved section 4*a* may be preferably formed on the pipe portion 4 but is not indispensable for this invention and may be omitted.

The application of this invention is not limited to a V-type six-cylinder internal combustion engine and may be applied to any multi-cylinder engine irrespective of the number or orientation of the cylinders.

In the embodiment above, only a single discharge vent 7 is provided on the blow-by gas passage 3. However, it is possible to apply this invention to an intake manifold having multiple discharge vents 7. In the same manner, this invention may be applied to an intake manifold provided with a plurality of partitioning members 12. It is also possible to divide the inner side of the pipe portion 4 and the collector 5 into three or more spaces.

What is claimed is:

1. An intake manifold for supplying air to each cylinder of a multi-cylinder internal combustion engine, the engine having a blow-by gas passage that recirculates blow-by gas generated by the engine into the intake manifold, the intake manifold comprising:

a pipe portion;

a collector connected to the pipe portion;

a plurality of branch pipes branching from the collector;

a partitioning member partitioning the internal section of the pipe portion and the collector into a plurality of spaces; and a blow-by gas discharge vent having an opening straddling the partitioning member and allowing discharge of the blow-by gas from the blow-by gas passage into the spaces on both sides of the partitioning member.

2. The intake manifold as defined in claim 1, wherein the number of discharge vents is less than the number of the spaces.

3. The intake manifold as defined in claim 1, wherein the open surface areas of the discharge vent facing the spaces on both sides of the partitioning member are equal.

4. The intake manifold as defined in claim 1, wherein the intake manifold comprises only one discharge vent.

5. The intake manifold as defined in claim 1, wherein the partitioning member has a notch around the discharge vent.

6. The intake manifold as defined in claim 1, wherein the internal combustion engine has two banks relative to the layout of the cylinders, and the partitioning member is adapted to divide the internal section of the collector and the pipe portion into two spaces, a plurality of branch pipes comprise a first group of branch pipes connecting one of the spaces with cylinders disposed on one of the two banks and another group of branch pipes connecting the other of the spaces with cylinders disposed on the other of the two banks.

7. The intake manifold as defined in claim 1, wherein the pipe portion has a curved section, and the discharge vent is formed on the outer periphery of the curved section.

8. The intake manifold as defined in claim 7, wherein the curved section is formed in proximity to the collector.

* * * * *